United States Patent
Cha et al.

(10) Patent No.: US 9,766,357 B2
(45) Date of Patent: Sep. 19, 2017

(54) SEISMIC IMAGE DIP DECOMPOSITION ESTIMATION AND RECOMPOSITION

(71) Applicants: Young Ho Cha, Houston, TX (US); William Curry, Houston, TX (US)

(72) Inventors: Young Ho Cha, Houston, TX (US); William Curry, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 434 days.

(21) Appl. No.: 14/491,467

(22) Filed: Sep. 19, 2014

(65) Prior Publication Data

US 2015/0124559 A1 May 7, 2015

Related U.S. Application Data

(60) Provisional application No. 61/900,109, filed on Nov. 5, 2013.

(51) Int. Cl.
  *G01V 1/00* (2006.01)
  *G01V 1/36* (2006.01)
(52) U.S. Cl.
  CPC ........ *G01V 1/362* (2013.01); *G01V 2210/322* (2013.01); *G01V 2210/512* (2013.01); *G01V 2210/522* (2013.01)
(58) Field of Classification Search
  CPC ............. G01V 1/362; G01V 2210/512; G01V 2210/322; G01V 2210/522
  See application file for complete search history.

(56) References Cited

U.S. PATENT DOCUMENTS

| | | | | |
|---|---|---|---|---|
| 2007/0223788 | A1* | 9/2007 | Pinnegar | G06K 9/0053 382/109 |
| 2009/0251995 | A1* | 10/2009 | Nichols | G01V 1/28 367/73 |
| 2014/0293744 | A1* | 10/2014 | Zhang | G01V 1/28 367/53 |

OTHER PUBLICATIONS

Compton, S. et al. (2012), "3D nonlinear stack enhancement: Correlation based stacking," *SEG Expanded Abstracts*, 5 pgs.
Matson, K.H. et al. (2012), "Signal enhancement using diversity shot stacking for reverse time migration (DeSSeRT)," *SEG Expanded Abstracts*, 5 pgs.
Vyas, M. et al. (2012), "Optimal Stacking," *SEG Expanded Abstracts*, 5 pgs.
Whiteside, W. et al. (2012), "Directional imaging stack (DIS) for shot based pre-stack depth migration," *SEG Expanded Abstracts*, 5 pgs.
Xu, Q. et al. (2011), "Reverse Time Migration Vector Offset Output to Improve Subsalt Imaging—A Case Study at the Walker Ridge GOM," *SEG Expanded Abstracts*, pp. 3269-3274.

* cited by examiner

*Primary Examiner* — Krystine Breier
(74) *Attorney, Agent, or Firm* — ExxonMobil Upstream Research Company, Law Departement

(57) ABSTRACT

Method for optimal stacking of seismic images to remove noise and enhance signals in seismic images (101) outputted from a Reverse Time Migration (RTM) imaging process. Dip information is calculated (102) and then sorted by image point (104), for each seismic image to be stacked. A dominant dip and azimuth is determined at each image point (106), and only those events are stacked (107). If the image is still noisy or lacking in detail (108), the process may be iterated (109) to improve the selection of most likely dip and azimuth.

15 Claims, 13 Drawing Sheets

SEISMIC IMAGE DIP DECOMPOSITION ESTIMATION AND RECOMPOSITION

CROSS-REFERENCE TO RELATED APPLICATION

This application claims the benefit of U.S. Provisional Patent Application 61/900,109, filed Nov. 5, 2013, entitled SEISMIC IMAGE DIP DECOMPOSITION ESTIMATION AND RECOMPOSITION, the entirety of which is incorporated by reference herein.

FIELD OF THE INVENTION

This disclosure relates generally to the field of geophysical prospecting for hydrocarbons and, more particularly, the seismic data processing. Specifically, the disclosure relates to optimal stacking of shot images outputted from a Reverse Time Migration (RTM) imaging process, to remove noise and enhance RTM images.

BACKGROUND OF THE INVENTION

Migration is a common and essential technique for processing shot gathers of seismic data acquired in the field to produce a subsurface image with reflectors at their correct locations. There are various migration methods to produce a subsurface image such as Kirchhoff migration, beam migration, one-way wave equation migration, and reverse time migration. The basic principle of migration is almost the same regardless of the migration methods: (1) calculate forward wavefield from a source location using an assumed model of subsurface acoustic velocity, (2) reconstruct the receiver wavefield from receiver locations, and then (3) apply an imaging condition using the forward and reconstructed wavefields at image points. This principle migrates seismic events to their correct locations, but it also causes migration artifacts (known as migration swing or smile) because of the limited source and receiver coverage in a shot gather. The process of stacking (summing) migrated images of many shots, if they are regularly distributed in an area, cancels out the migration artifacts effectively. In a region of complex geologic structure like subsalt, stacking the shot images is not enough to cancel out the migration artifacts because of spatially varying illumination caused by complex overburdens and structures. For such regions, a more careful post-processing method may be applied to remove noise and enhance signals.

Migration methods may be categorized into ray-based and wave-equation-based migrations. Kirchhoff and beam migration are ray-based methods, and the inputs are usually surface offset (distance between source and receiver) gathers or angle gathers, and the migration output could be the subsurface images contributed by the different surface offsets or reflection angles at image points. Muting as a function of offset vs. depth or angle vs. depth can easily be applied to remove noises at shallow depths, and residual move-out can be applied to flatten reflectors with respect to offset or angle to enhance signals. These two post-processing techniques are very straightforward to apply to the migration output from Kirchhoff and beam migration because the outputs from the two methods are decomposed already in offset or angle at every image point.

Wave equation based migration has been widely applied in the oil and gas industry because it gives high fidelity images for geologically complex subsurface regions. The input for wave equation based migration is typically a shot gather, which contains traces at receiver points of various offsets, and it is typically performed shot-by-shot. The migration output is the subsurface image of each shot gather, and the final image is the stack of images of individual shots. Because of its nature of shot-by-shot implementation, it is difficult to apply two popular post-processing methods (muting and residual move-out) to wave equation based migrations such as one-way wave equation migration and reverse time migration. These two easy and effective methods could be applied to shot-based migration if angle gathers at each image point of each shot could be generated. However, the calculation of the angle gathers at each image point for each shot gather often is very computationally expensive.

An alternative way of post processing for shot-based migration is to make partial stacks from individual shot images, typically numbering between 9 and 20 and, usually based on the relative position of the source location to the image point (Whiteside et al. (2012), Compton and Stork (2012), Matson et al. (2012), and Vyas and Sharma (2012)).

Whiteside et al. (2012) proposed a Directional Imaging Stack (DIS) method for shot based migration, consisting of 1) making partial images (typically 3×3 or 4×5 grid and dimension of 2 to 3 km on a side), 2) calculating spatially dependent weights for the partial images in the previous step (by least squares to maximize the signal to noise ratio using a target image or by a semblance field), and 3) stacking the partial images with optimal weights. Compton and Stork (2012) proposed correlation based stacking for shot based migration, consisting of 1) stacking the prestack gathers to produce a reference model, 2)measuring the coherency of every sample in each prestack gather by correlation with the obtained reference model in step 1), 3) computing weights, and 4) restacking the weighted gathers. Matson et al. (2012) proposed Diversity Shot Stacking for Reverse Time Migration (DeSSeRT), consisting of 1) making sub-stacks of shot-image gathers according to relative location of image points from a shot location, 2) finding weights for the sub-stacks using a least-squares matching filter, and 3) applying the designed matching to the sub-stacks and stacking. Vyas and Sharma proposed a method of optimal stacking, consisting of 1) preconditioning the data, 2) finding a metric of similarity between multiple volumes of data of image, 3) searching for elements that are similar to each other, and 4) creating a stack using the identified chain.

The four methods mentioned above have demonstrated signal enhancement and noise removal for shot-based migration. However, these methods reduce the amount of input data for stacking substantially by the forming of partial or sub-stacks, where valuable information in individual images could be rendered invisible. In particular, local dips that may be separated on a shot-by-shot basis may be combined by partial stacking, reducing the effectiveness of dip-estimation methods in the area. The aforementioned remedial methods also need to have a target or reference image to compare a sub-stack with. Thus, the final output of these four methods is highly dependent on the quality of the target image. Amplitude information might not be preserved very well during the final stacking process with the different weights of each partial stack.

To overcome these disadvantages of the methods mentioned above, the present invention is designed to utilize all possible data for the stacking process, to be an automated process only lightly guided by geologically interpreted surfaces, and to be iterative so as to extract missing events from the previous iteration.

SUMMARY OF THE INVENTION

In one embodiment, the invention is a computer-implemented method for an optimal stacking procedure to remove noise and enhance signals in 2D or 3D seismic images, comprising: (a) obtaining two or more migrated seismic shot images to be stacked to generate a subsurface image; (b) calculating dip information of seismic events at each image point in each seismic shot image, said dip information comprising dip for a 2-D image or dip and azimuth for a 3-D image; (c) estimating dominant dips of seismic events at each image point, using the calculated dip information; (d) extracting a dominant event at each image point from each seismic shot image; and (e) stacking the extracted event from (d) at each image point from each seismic shot image; wherein at least (b), (d) and (e) are performed using a computer.

BRIEF DESCRIPTION OF THE DRAWINGS

The present invention will be better understood by referring to the following detailed description and the attached drawings in which:

FIG. 3 shows a P-wave velocity model for synthetic data generation and reverse time migration;

FIG. 4 shows a reverse time migration image after stacking individual shot images;

FIG. 5 shows migrated image for a shot and its dip field;

FIG. 6 shows calculated dipx at (7,500 m, 4,800 m) from all migrated shot gathers;

FIG. 7 shows a dip analysis panel for estimating a dominant dip;

FIG. 8 shows the estimated dominant dip;

FIG. 9 shows dominant event extraction for a shot migration image;

FIG. 10 shows a reverse time migration stack after applying the present inventive method;

FIG. 11 shows a comparison between a raw stack and an optimal stack (the left side of the salt body);

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

A core aspect of the invention is to improve stacking of shot-based migrations by calculating dip and azimuth within every migrated shot in order to geologically separate dips from spurious events at each image point, then extracting the meaningful events from every migrated shot, followed by stacking the extracted images, possibly in an iterative process to improve the stacked images. Basic steps in two embodiments of the present inventive method are listed in the flow charts of FIG. 1 and FIG. 2.

Figure 1:
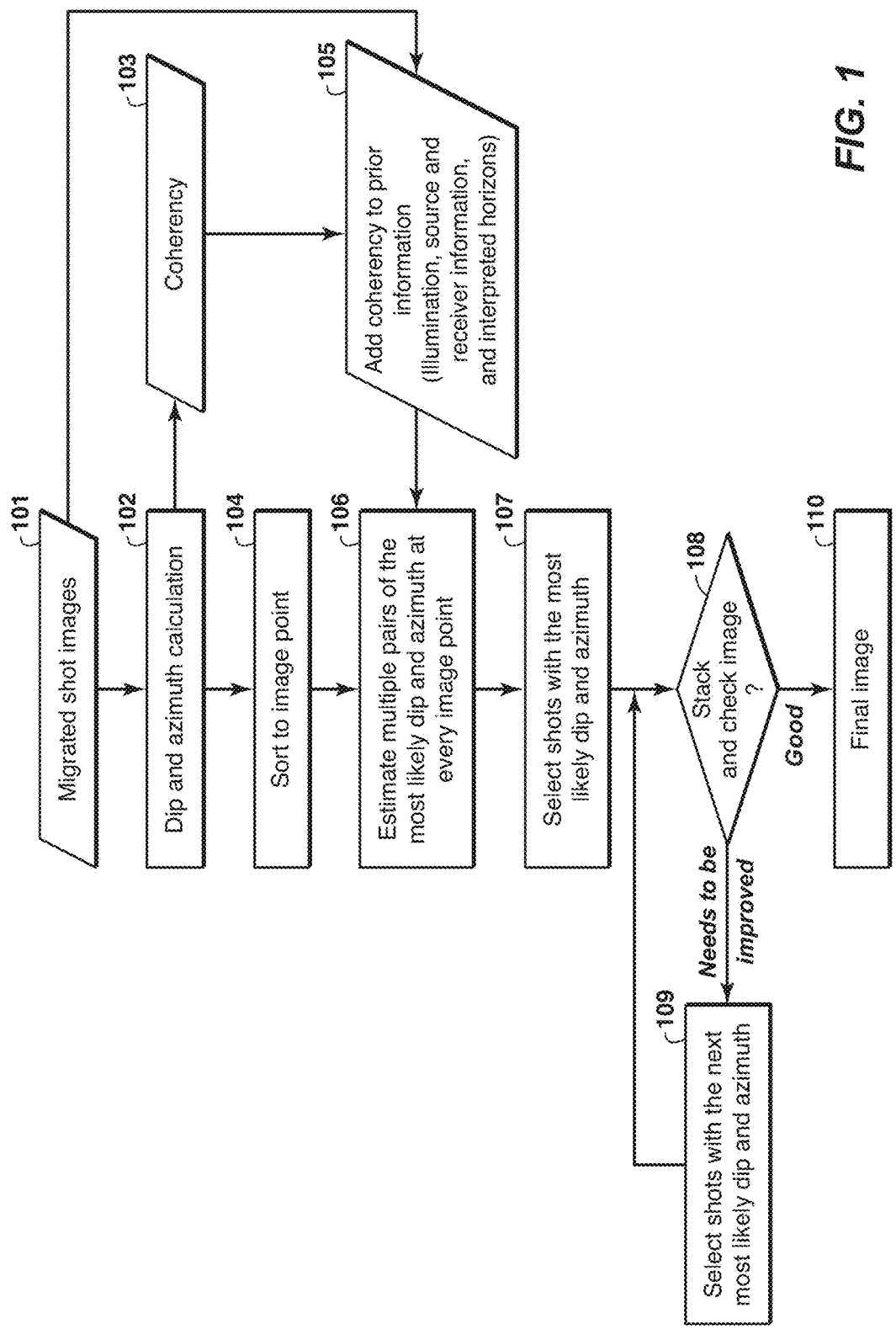
FIG. 1 is a flow chart showing basic steps in one embodiment of the present invention for optimal stacking of seismic images.

FIG. 1 shows one way to implement the optimal stacking method of the present invention. At step 101, seismic images are obtained to be stacked for a final image. At step 102, the dip and azimuth of seismic events are calculated at each image point in each seismic image from step 101. Here, azimuth refers to the angular orientation, usually the angle between a reference vector on a horizontal plane and a vector that is perpendicularly projected from a normal vector of a seismic reflector onto the horizontal plane. Dip means the angle that the normal vector of the reflector surface makes with the horizontal in a vertical plane. If the obtained seismic images are a 2D section, step 102 will calculate the dip of seismic events only. Hereafter, to make explanation of the invention simpler, it will be assumed that the obtained seismic images from step 101 are 3D seismic image volumes, but the treatment of 2D cross-sections is straightforward and obvious and definitely included within the scope of the present invention. In step 103, the coherency of seismic events from step 102 is computed at each image point in each seismic image. The coherency of a seismic event is a measure of local coherency of the seismic event at an image point along the calculated dip and azimuth. Step 104 sorts seismic image, dip and azimuth to each image point for step 106. Step 102 may be thought of as generating calculated dip and azimuth sorted in z-x-y-shot ID order, whereas step 104 is a process that sorts its inputs into a shot ID-z-x-y order to prepare for the steps that follow. Step 104 produces an image gather with multiple dips and azimuths at each image point, where each dip/azimuth pair is from a single migrated shot. At step 105, prior information is gathered for step 106, information such as coherency from step 103, subsurface illumination information, source and receiver information of each seismic image, and interpreted geologic horizons.

At step 106, a plurality (as many as may be considered to be geologically reasonable) of the most likely dip and azimuth pairs are estimated at each image point. At each image point, image gathers produced in step 104 within a 3D moving window may be captured, and the center point of the 3D moving window is the location of the current image point. Then, a 2D weighted histogram binned by dip and azimuth may be generated, where the weights might be energy or power of the seismic image amplitude, scaled using subsurface illumination information from step 105 and/or source and receiver information from an image point and/or the coherency from step 103. Then, multiple pairs of the most likely dip and azimuth can be picked from the 2D histogram panel, where the interpreted horizons can be used to guide the picking process to follow the horizons and the strength of the guide may be adjustable image point by image point. After estimating multiple pairs of the most likely dip and azimuth at every image point, post-processing such as smoothing and muting may follow to make the picked pairs more geologically meaningful. Other statistical analysis and optimization may optionally be used to make this step more stable and more geologically meaningful.

At step 107, shots are selected based on the most likely dip and azimuth, which was estimated in step 106, at each image point in each seismic image. There can be many uncertainties in dominant dip estimation. Some areas of the dip field are good for estimating and some are bad. It may be preferable to extract dominant events aggressively in areas where the estimation of the dominant dip is good and extract dominant events less aggressively in areas where the estimation is bad due to noise or poor shot coverage.

At step 108, the selected shots with the most likely dip and azimuth are stacked, and the stacked image is checked for whether it needs to be improved or not. This check may, for example, be performed by user interaction, where the user compares raw and optimal stacks and analyzes the difference between them. During steps 107 and 108, shot selection and stacking can be done using a defined range (windows) of dip and azimuth, where a given dip/azimuth pair is at the center of the window, and a taper function for the edges of the windows of dip and azimuth can be applied to mitigate rapid amplitude changes in the final stack images. Step 109 is to select one or more shots with the next most likely dip and azimuth for step 108 if the stacked image from step 108 needs to be improved. Thus, step 108 determines how many of the dip-azimuth pairs picked at step 106 will be used to form the final image. Steps 108 and 109 may be repeated until the remaining shots do not contribute meaningfully to the final image. In step 110, the final stacked image from the iterative process of steps 108⇔109 may be saved.

Figure 2:
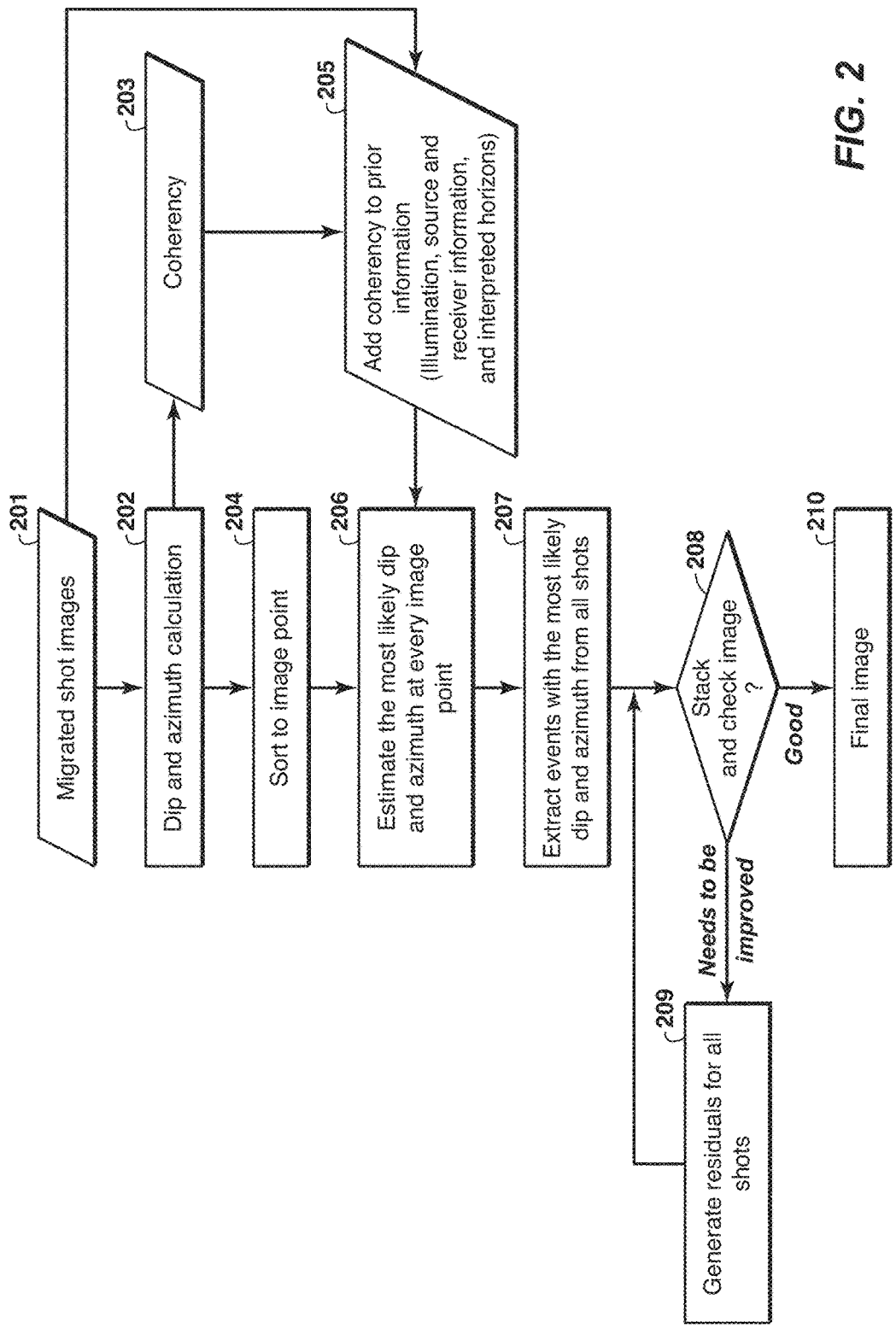
FIG. 2 is a flow chart showing basic steps in a second embodiment of the present invention for optimal stacking of seismic images.

An alternative for implementing this inversion process is outlined in the flow chart of FIG. 2. The difference between the two example embodiments of the present invention involves how to deal with multiple dominant events at an image point. Steps 201 to 206 of FIG. 2 are exactly the same as steps 101 to 106. In step 207, events with the most likely dip and azimuth are extracted from all shots at each image point. This extraction may be done by a plane-wave destruction method or any other methods for local dip filtering. Step 208 is to stack the extracted events with the most likely dip and azimuth and to check whether the stacked image needs to be improved or not. At step 209, residuals are generated, where the residual is what remains in each seismic image after the most likely dip and azimuth event has been removed, for all seismic images if the stacked image from step 208 contains insufficient detail. Then, the generated residuals will be used for the iterative process in which steps 202 to 208 are repeated. This iterative process may be continued until the residual shot images no longer contain events that are significant to the final image. In step 210, the final stacked image from the iteration of steps 202-209 may be saved.

EXAMPLES

Figure 3:
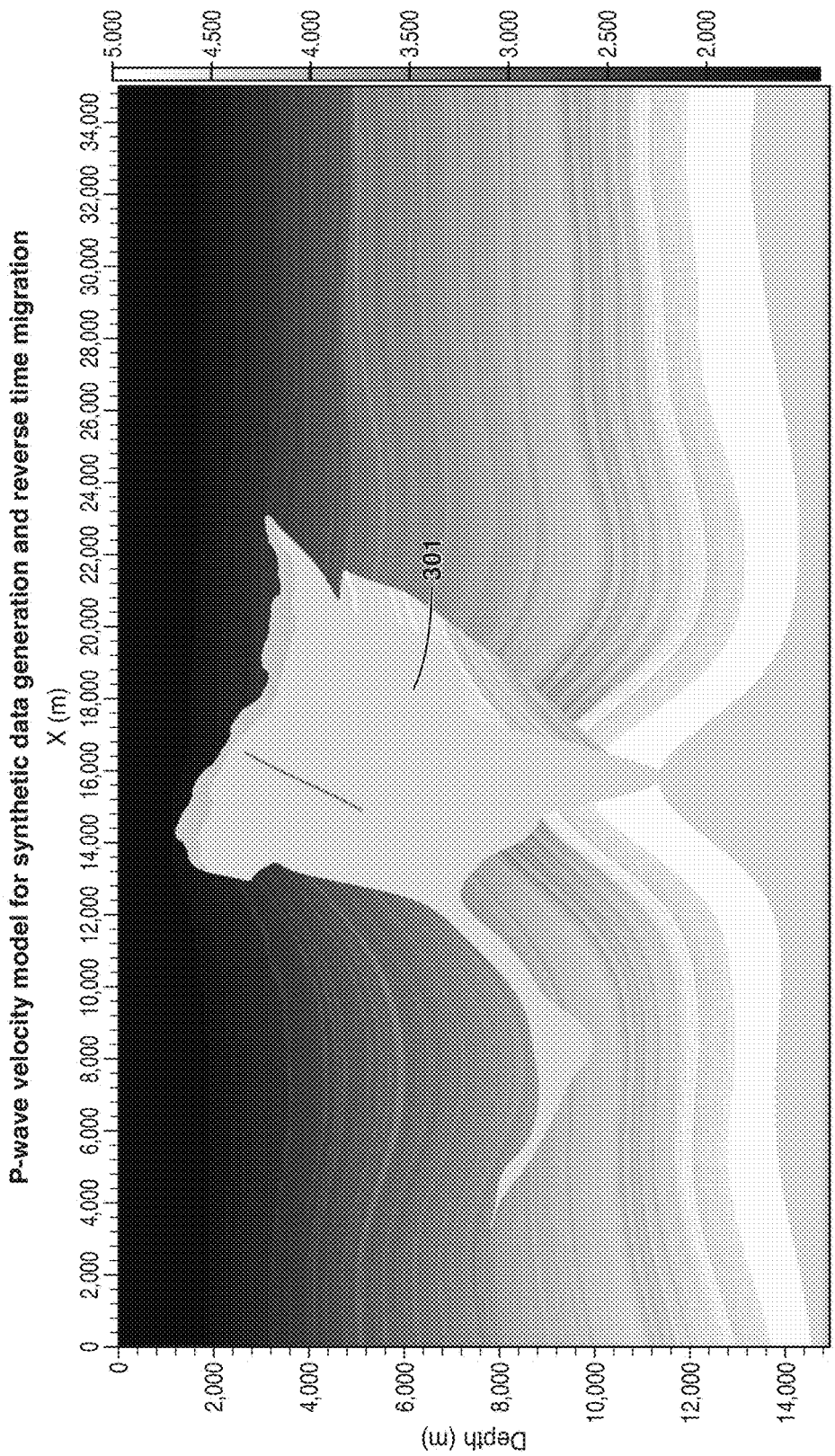
FIGS. 3-11 relate to a test example of the method of FIG. 1, where.
Figure 4:
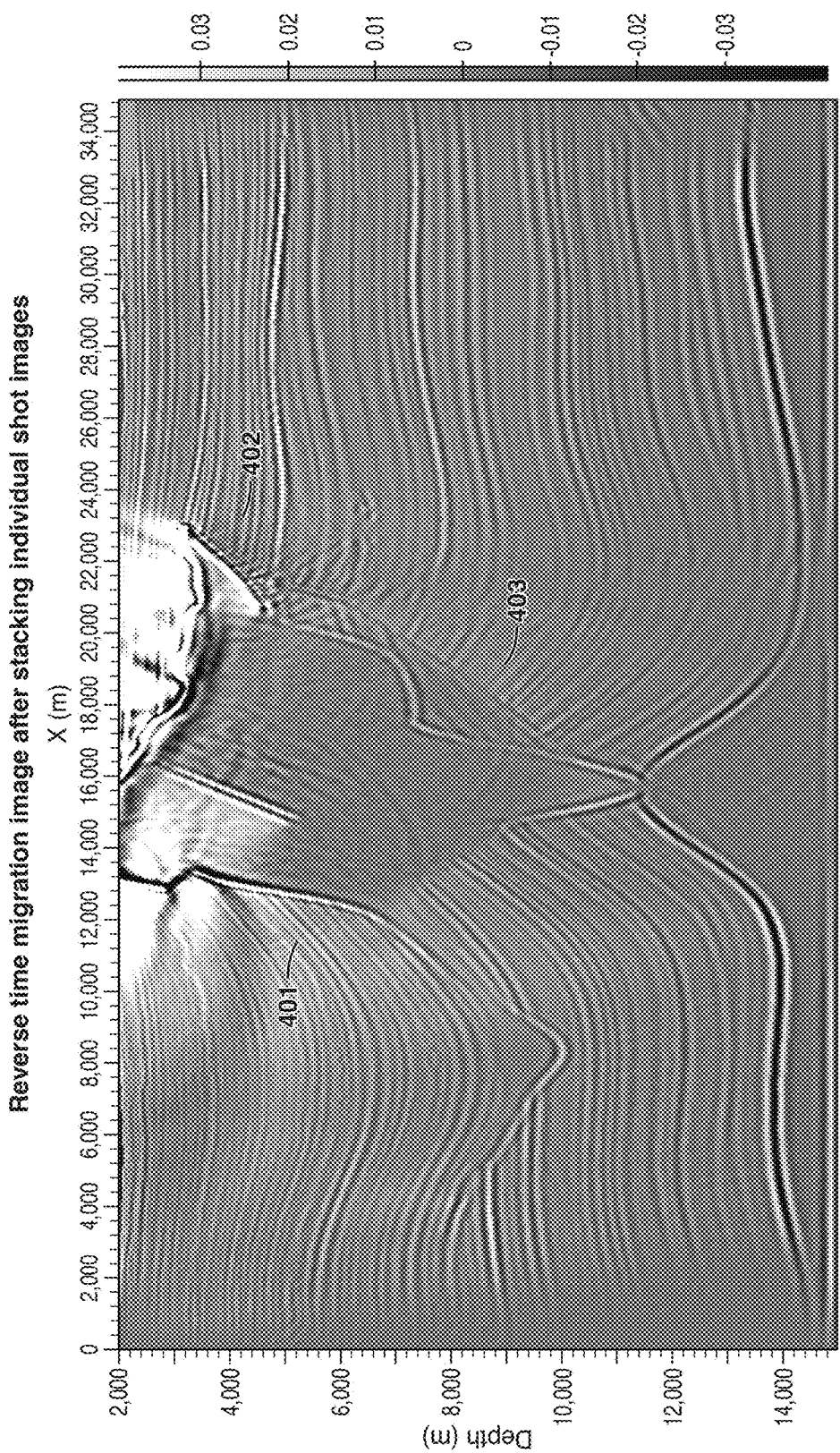

The embodiment of FIG. 1 was tested on a two-dimensional example. FIG. 3 shows a P-wave velocity model for synthetic data generation and reverse time migration. P-wave velocity increases with depth in sediment layers and 301 is a salt body of high velocity. In the sediment layer, lateral variation is very mild. FIG. 4 is a reverse time migration image (a conventional stacked image) for the model shown in FIG. 3, where no post-processing was applied before stacking. 401, 402 and 403 indicate unwanted noises generated by reverse time migration because of two major reasons in this synthetic example: variable or uneven illumination of acquisition geometry, and acoustic approximation of the elastic wavefield. The original velocity model shown in FIG. 3 does not have steep dip events in sediment layers in FIG. 4 indicated by 401, 402 and 403, which means that 401, 402 and 403 should be treated as noises and removed in a proper way before stacking.

Figure 5:
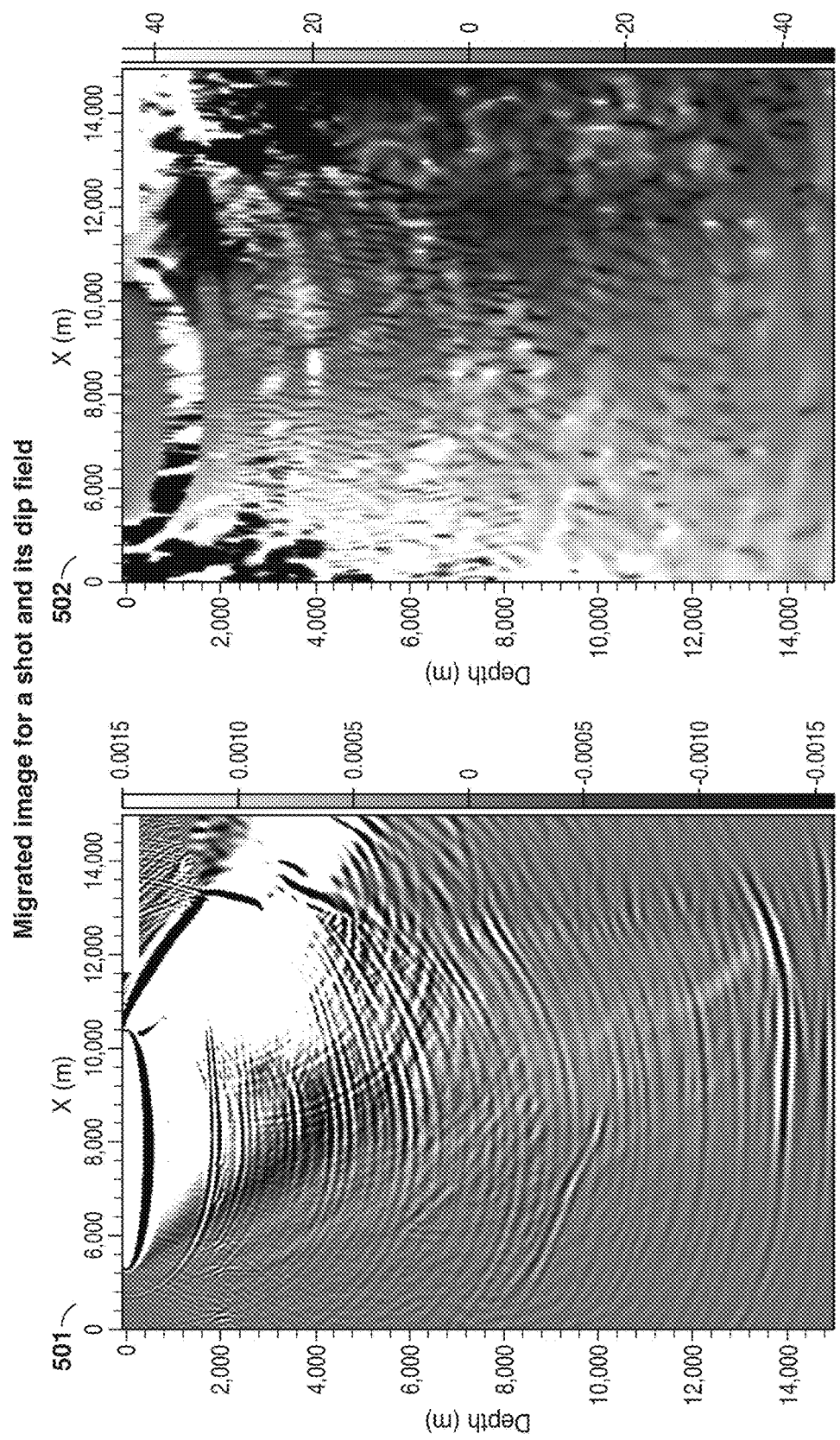
Figure 6:
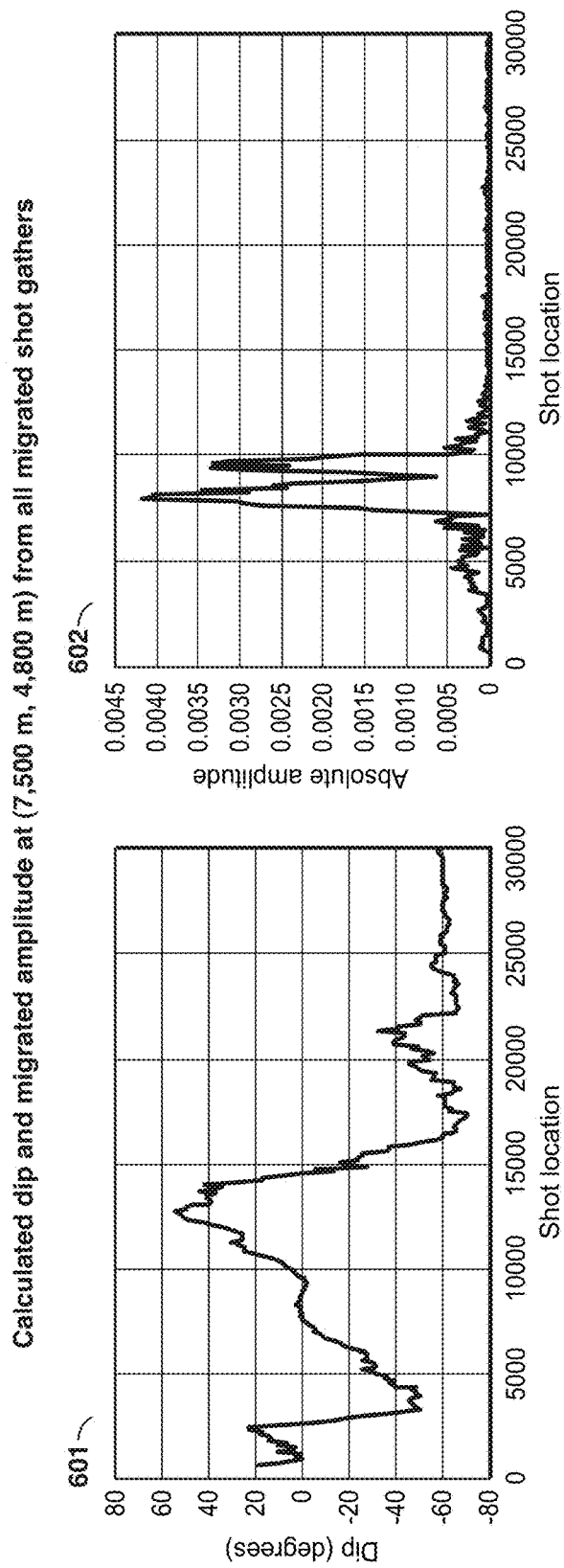

FIG. 5 shows a result of step 102 in FIG. 1, a dip field (a two dimensional example produces only dip) calculated from a seismic image. 501 is the input seismic image and 502 is the dip field of 501. 502 shows a typical dip field of a shot migration with migration smile or swing (negative dips from 4,000 m to 7,000 m in the x-direction). FIG. 6 shows the calculated dip and absolute value of the migrated image distributions at an image point (7,500 m, 4,800 m) from each of the migrated shots (step 104). 601 is a dip distribution at the image point and varies widely from −60 degrees to 60 degrees, which is a typical migration response or swing. The dominant dip at the image point in the velocity model in FIG. 3 can be seen to be almost zero degrees. So we would expect to see this reflected in FIG. 6, which in fact is the case only at shot locations from 7,000 m to 10,000 m which are close to the horizontal location of the image point of 7,500 m. The shots from 7,000 m to 10,000 m contribute to produce a dominant event at the location as evidenced by the strong amplitudes shown in 602. The present invention extracts those events that positively contribute to form a dominant event and exclude the events like migration swing that are outside of the dominant shot range.

Figure 7:
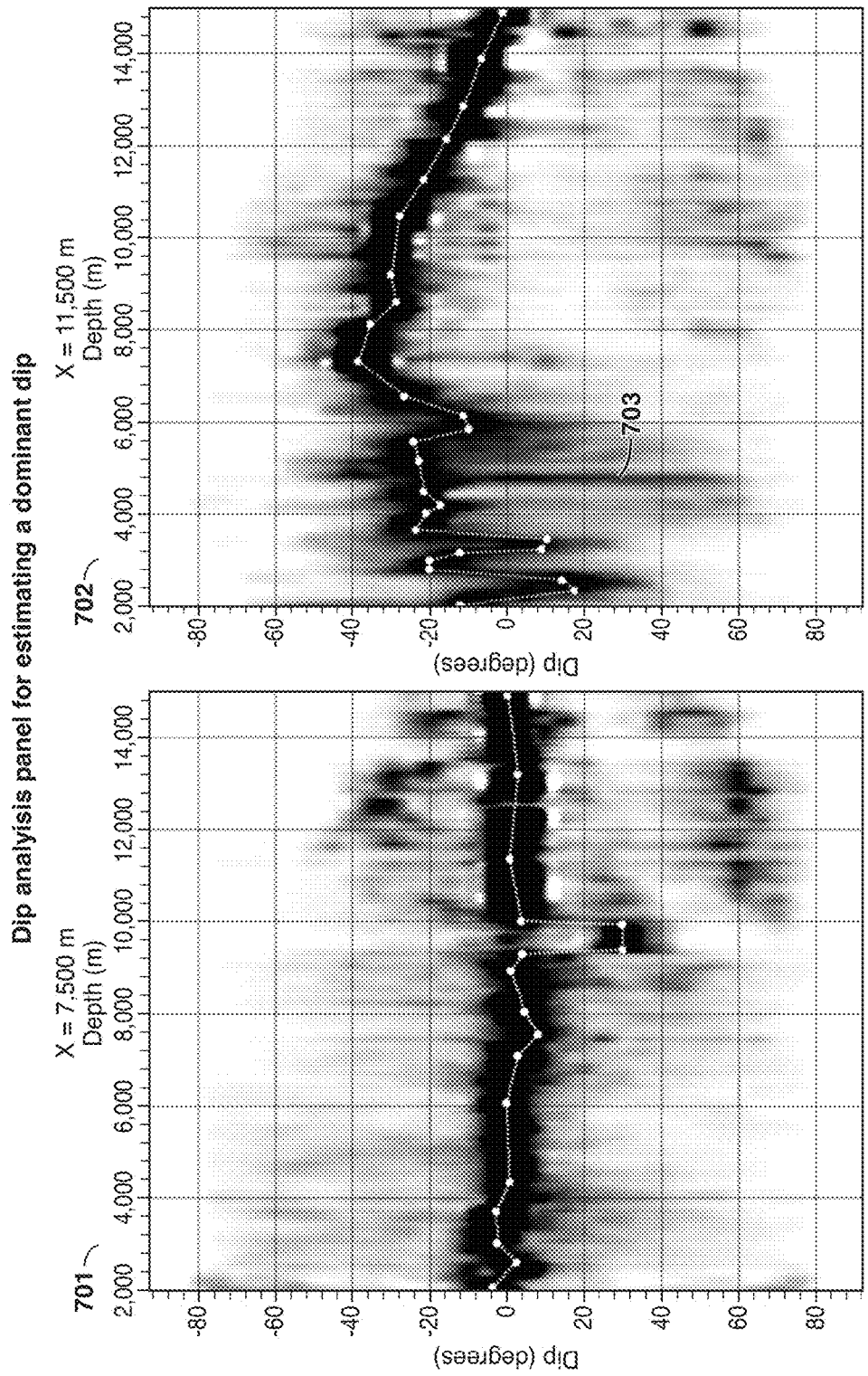
Figure 8:
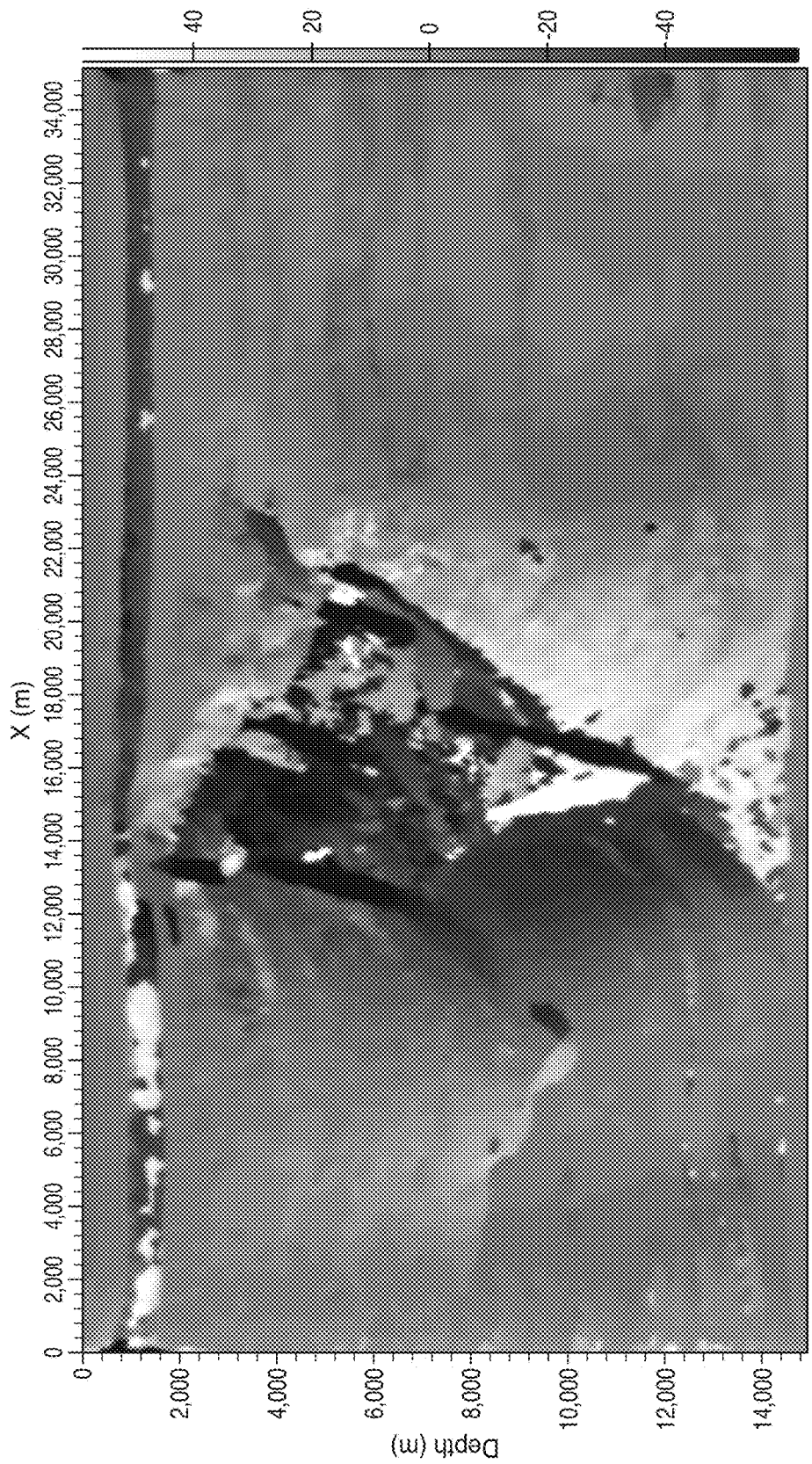

After calculating dip fields from all migrated shots, panels for dominant dip analysis were generated in FIG. 7 for performing step 106. 701 is a dip analysis panel at 7,500 m in the x-direction, where the black color means high amplitude and the white means low amplitude. One can easily pick a dominant dip like the white dotted line, manually or automatically. The illumination information in step 105 is used to generate the dip analysis panel in 701. 701 shows that dominant dips varies between −10 to 10 degrees except for the depth from 9,000 m to 10,000 m of salt body. 702 is a dip analysis panel at x=11,500 m where noise 401 is easily identified in FIG. 4. One can easily follow a dominant dip field through the black banded area, e.g. the white dotted line. 703 is a high amplitude area of the event generated from 401. For the depth near 703, we pick about −20 degrees instead of ~30 degrees, due possibly to a geological trend provided in step 105. Thus, the noise 401 can be removed at step 107 by picking a dominant dip of −20 degrees instead of 30 degrees at this location. This process could be performed in an automatic or semi-automatic way for each image point. FIG. 8 shows an estimated dominant dip field for each image point, the result of step 106. The estimated dominant dip in the sediment layer varies mildly as would be expected based on the structures in FIG. 3.

Figure 9:
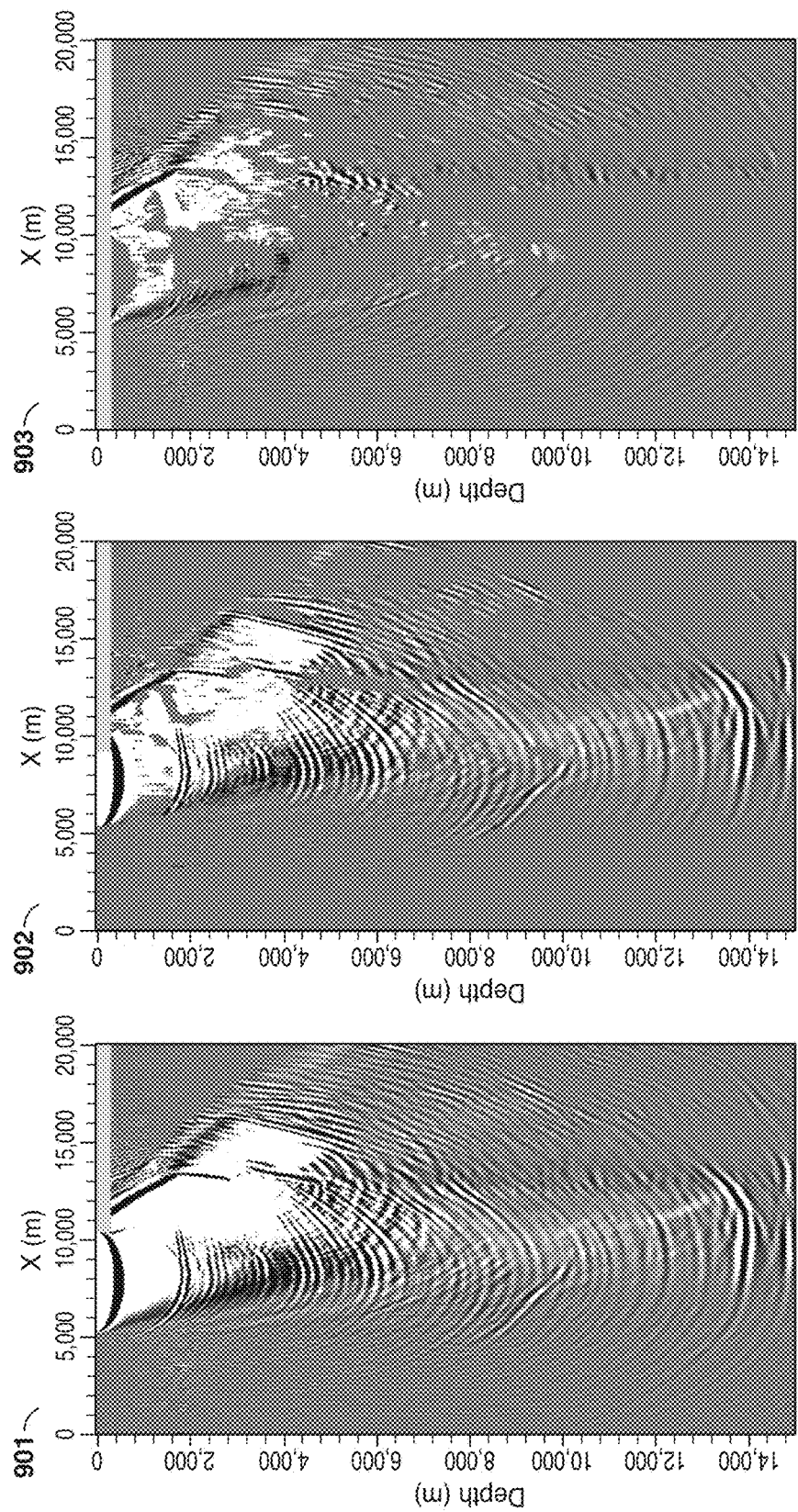

The next step (step 107) is to extract the event with the dominant dip. FIG. 8 shows the extracted dominant dip for the full range of x. When step 107 is performed in the shot gather domain, step 107 may be regarded as an extraction of the dominant event. When step 107 is performed in the image point domain, it may be regarded as a process that selects shots with the dominant dip at each image point. FIG. 9 is a result of step 107 for a shot. 901 is an input migrated image of a shot, 902 is a migrated image of a shot after extraction of the dominant event from step 107, and 903 is what remains after the extraction of the dominant event of step 107. The remaining events in 903 seem to be migration artifacts. Thus, 902 is one of input migration images for step 108.

Figure 10:
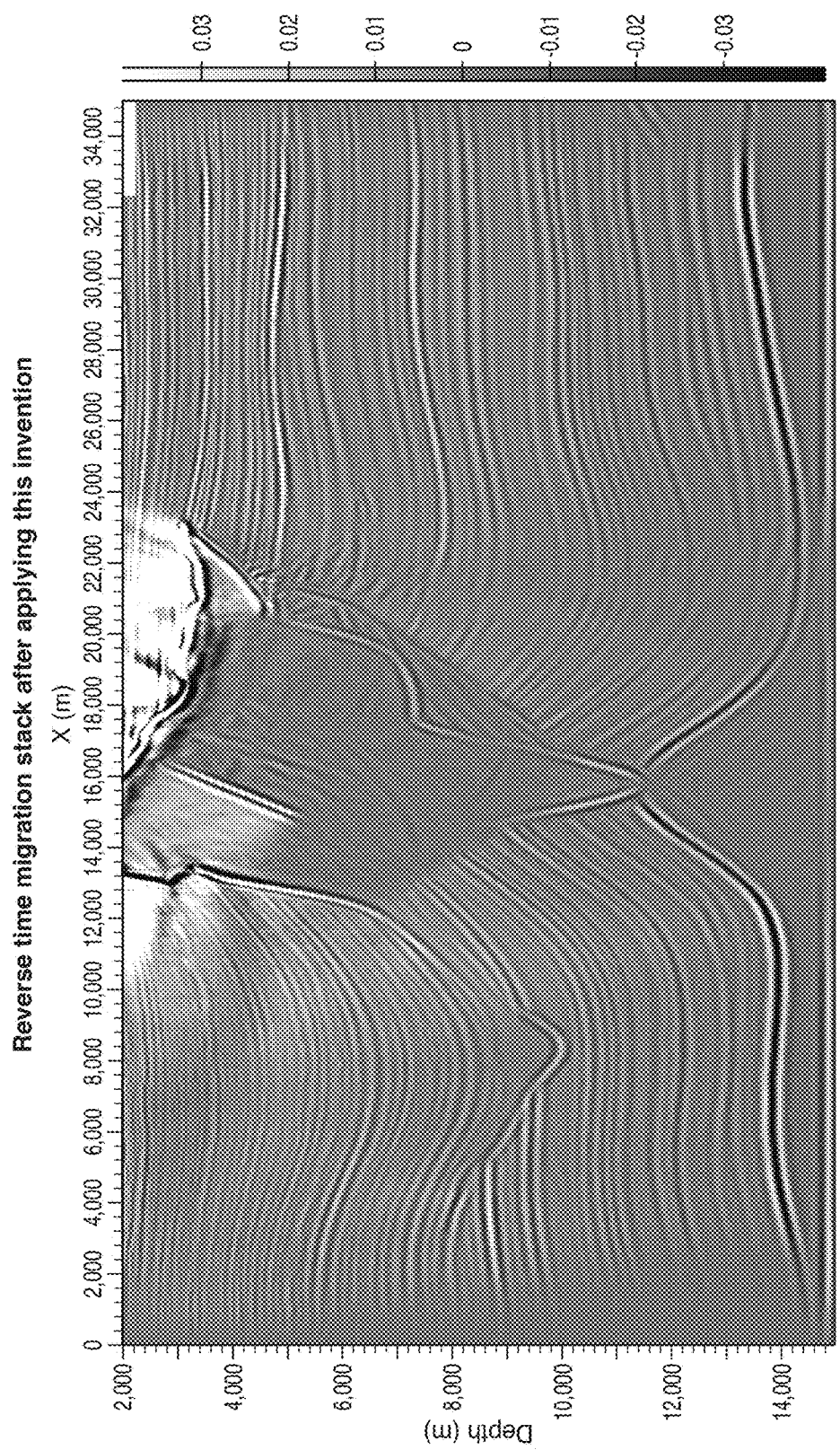
Figure 11:
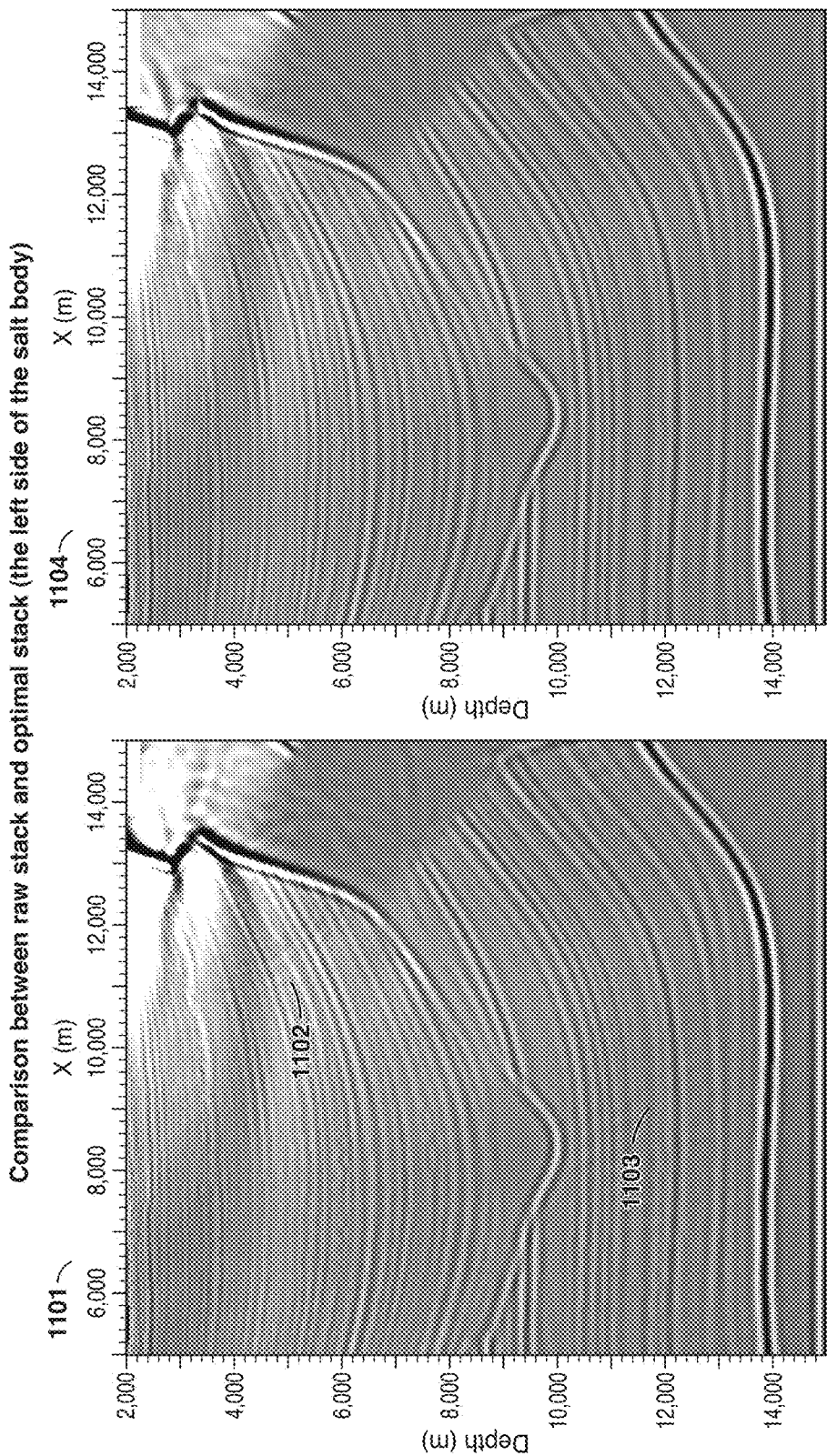
Figure 12:
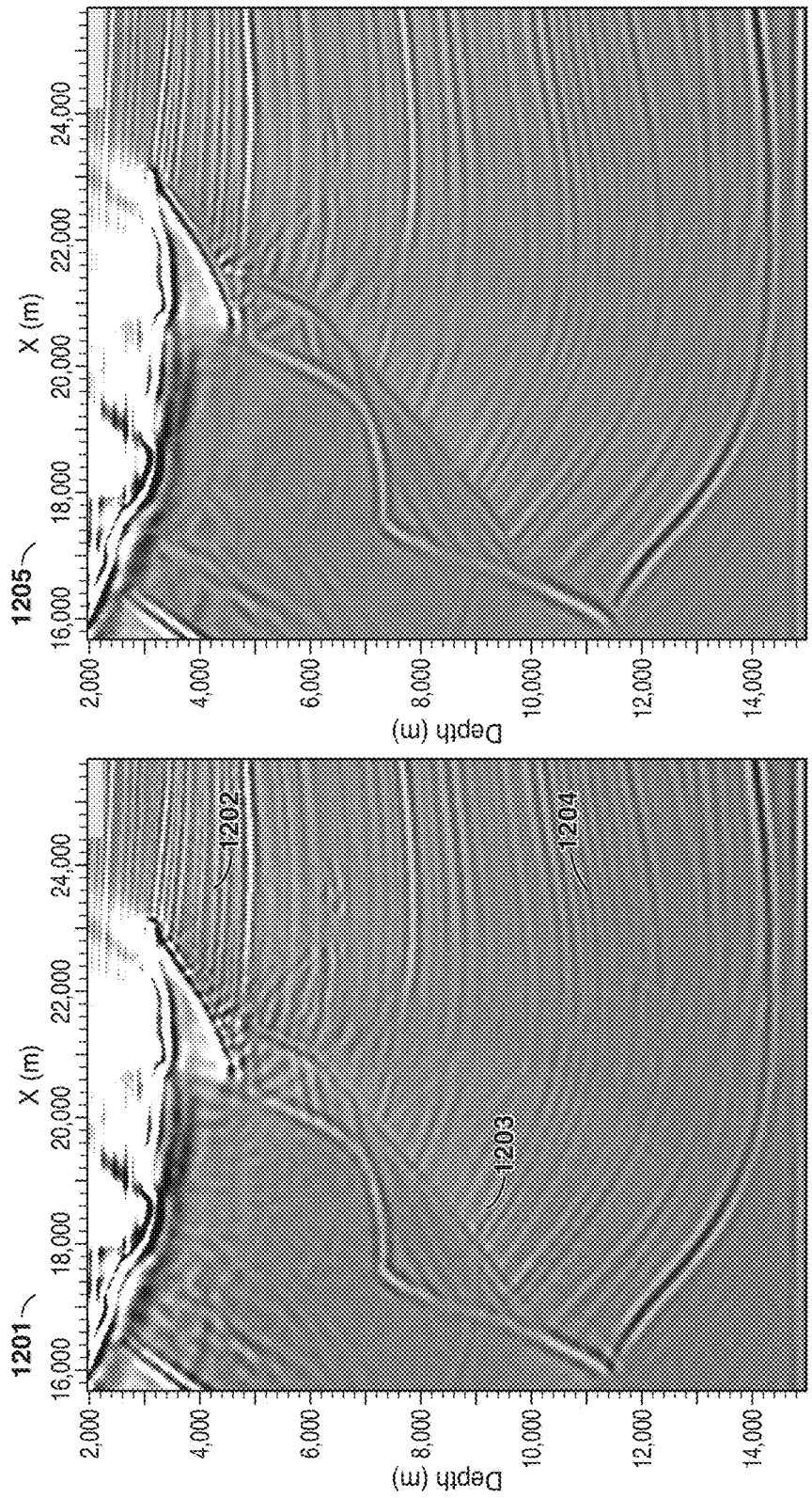
FIG. 12 shows a comparison between a raw stack and an optimal stack (the right side of the salt body)
Figure 13:
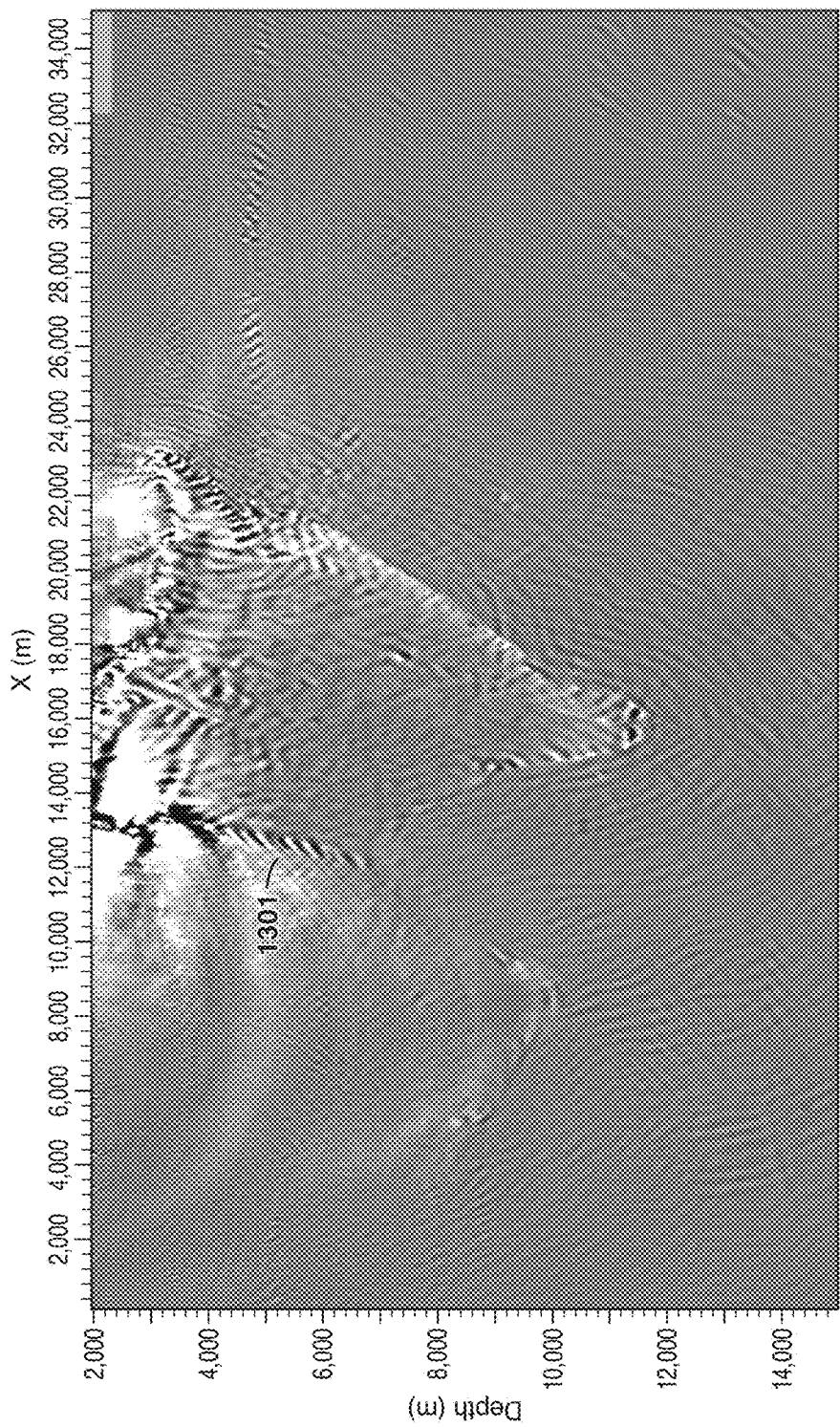
FIG. 13 shows difference between the raw stack in FIG. 4 and the optimal stack in FIG. 10.

FIG. 10 shows the resulting stacked image (the result of step 108). The noises 401, 402, and 403 in FIG. 4 have been successfully removed. Overall signal-to-noise ratio has increased. FIGS. 11 and 12 are comparisons at two zoomed areas between the raw stack in FIG. 4 and the post-processed stack in FIG. 10. 1101 and 1104 are a raw stack from FIG. 4 and an optimal stack from FIG. 9 at the left side of the salt, respectively. 1102 and 1103 are examples of noise and steep dip events in sediment layers in 1101 that the present invention is intended to remove, and indeed they are invisible in 1104. 1201 and 1205 are a raw stack from FIG. 4 and an optimal stack from FIG. 9 on the right side of the salt, respectively. 1202, 1203 and 1204 are noise that should be removed from 1201, and in fact 1205 shows very clear sediment layers without conflicting events. FIG. 10 and, particularly, FIGS. 11 and 12 demonstrate how the image may be checked in step 108. Another way to check the quality of the output from step 108 is to analyze the difference between the raw stack in FIG. 4 and the optimal stack in FIG. 10. FIG. 13 shows the difference between two stacks and the events remaining in FIG. 13 are not strong events that follow geological structure shown in the velocity model in FIG. 3. If one might want to extract the remaining events 1301, step 109 could be performed in a target-oriented manner to extract them.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Matson, K. H., Cloppard, J., and Cattermole, P, "Signal enhancement using diversity shot stacking for reverse time migration (DeSSeRT)," 82th Annual International Meeting, SEG, Expanded Abstracts (2012).

Compton S. and Stork C., "3D nonlinear stack enhancement: Correlation based staking)," 82th Annual International Meeting, SEG, Expanded Abstracts (2012).

Vyas, M. and Sharma, Arvind, "Optimal Stacking," 82th Annual International Meeting, SEG, Expanded Abstracts (2012).

Whiteside, W., Yeh, A., and Wang, B., "Directional imaging stack (DIS) for shot based pre-stack depth migration," 82th Annual International Meeting, SEG, Expanded Abstracts (2012).

The invention claimed is:

1. A computer-implemented method for an optimal stacking procedure to remove noise and enhance signals in 2D or 3D seismic images, comprising:
   (a) obtaining two or more migrated seismic shot images to be stacked to generate a subsurface image;
   (b) calculating dip information of seismic events at each image point in each seismic shot image, said dip information comprising dip for a 2-D image or dip and azimuth for a 3-D image;
   (c) estimating dominant dips of seismic events at each image point, using the calculated dip information;
   (d) extracting a dominant event at each image point from each seismic shot image; and
   (e) stacking the extracted event from (d) at each image point from each seismic shot image;
wherein at least (b), (d) and (e) are performed using a computer.

2. The method of claim 1, wherein the dominant event extracted in (d) is an accumulated, i.e. stacked or summed, image from shots having most likely dip, or dip and azimuth.

3. The method of claim 2, further comprising checking the stacked image from (e) for presence of detail or lack of noise or both, and, if unacceptable, repeating (d)-(e) at least once wherein, in (d), a next most dominant event is also extracted.

4. The method of claim 1, wherein the dominant event to be extracted in (d) is determined based on most likely dip, or dip and azimuth, for all shots, and the extraction of the dominant event from each seismic shot image leaves a residual image.

5. The method of claim 4, further comprising checking the stacked image from (e) for presence of detail or lack of noise or both, and, if unacceptable, repeating steps (b)-(e) at least once, wherein residual images generated in (d) are used as input for (b) and extracted events from each iteration are accumulated.

6. The method of claim 1, further comprising using the stacked image from (e) to prospect for hydrocarbons.

7. The method of claim 1, wherein estimating dominant dips in (c) comprises using one or more of amplitudes of seismic images, dip information, illumination, reference dip, geologically interpreted horizons, and statistical information.

8. The method of claim 1, wherein conflicting events at an image point are resolved by extracting at least two dominant events in (d).

9. The method of claim 1 where levels of the extraction of a dominant event vary spatially to produce a geologically meaningful stack image.

10. The method of claim 1, wherein the extracting of the dominant event in (d) is performed using plane wave destructor or local dip filtering techniques.

11. The method of claim 1, wherein, in (d), seismic images with a dominant dip, or dip and azimuth, are selected using a dip window, or a dip and azimuth window, with taper at the window's edges, where the dominant dip, or dip and azimuth, are identified as being at the center of the window.

12. The method of claim 1, further comprising using the method to stack migrated images in a migration technique to produce a final subsurface image, or using the method in computing gradient of a cost function in full wavefield inversion to infer a subsurface material property from seismic data.

13. The method of claim 1, wherein estimating dominant dips in (c) comprises using one or more of amplitudes of seismic images, dip information, illumination, reference dip, and geologically interpreted horizons.

14. The method of claim 11, wherein the dip window, or a dip and azimuth window, has dip as a coordinate axis.

15. The method of claim 12, further comprising prospecting for hydrocarbons based on the final subsurface image or the subsurface material property.

* * * * *